United States Patent Office 2,715,627
Patented Aug. 16, 1955

2,715,627

SOLVENT EXTRACTION OF OPIUM ALKALOIDS

Charles L. Mehltretter and Francis B. Weakley, Peoria, Ill., assignors to the United States of America as represented by the Secretary of Agriculture No Drawing. Application May 26, 1952,
Serial No. 290,109

4 Claims. (Cl. 260—285)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the solvent extraction of alkaloids from plant materials containing them. It relates, particularly, to the extraction of morphine and associated alkaloids from *Papaver somniferum*, commonly known as the opium poppy; and more particularly, to the extraction of such alkaloids from the dried stems and capsules of the opium poppy.

Opium, as the term is commonly used, refers to the dried latex of the opium poppy. It may be obtained by incising the unripe seed capsules and collecting the latex which exudes from the incision, after it has dried. The narcotic properties of opium are due principally to the morphine, which is present to the extent of about 10 percent in opium. There are numerous other alkaloids present in opium which possess narcotic properties and, like morphine, are valuable pharmaceutically.

The hand method of harvesting opium from poppies, as mentioned in the foregoing paragraph involves a large amount of hand labor and is not satisfactory in regions where labor costs are significant. Numerous methods have been devised for extracting alkaloids from the poppy plant. For example, since the alkaloids are concentrated mainly in the capsules, there may be crushed and extracted with various solvents. The poppy heads and straw may be dried and extracted with aqueous solvents to obtain an extremely dilute aqueous solution of alkaloids which may then be re-extracted with organic solvents to obtain a more concentrated solution of the alkaloid. Alternatively, the aqueous extract, which may be acid in character, may be concentrated by evaporation and a crude opium-like residue obtained.

The disadvantages of the foregoing and other prior art methods for extracting alkaloids from the opium poppy are that the initial extracts are extremely dilute, and costly and tedious concentration methods are required. Moreover, the residues obtained as final products are frequently quite crude and require further costly separation procedure before the alkaloids may be obtained in a satisfactory state of purity.

According to the present invention, dried poppy capsules, which may or may not be associated with stems or event the stalks and leaves of the whole poppy plant, are extracted with a binary solvent, whereby an efficient extraction is accomplished directly and whereby a relatively concentrated extract is obtained. The extract may be treated by known methods to recover a crude alkaloid product rich in valuable alkaloids, principally morphine and codeine. The invention will be described below as it is applied to "poppy straw," i. e., the ground poppy capsules associated with some of the stem section, but it is to be understood that it may be applied also to the unground capsules, stems, and stalks, the difference in procedure being but one of economic discretion. For example, one may elect to extract the whole, dried plant providing the additional alkaloids to be obtained thereby balance economically the additional solvent requirements.

The binary solvents are composed of a major portion of a lower alkanol having at least two carbon atoms, as for example, the propanols, the butanols, or the pentanols, or mixtures thereof. The solvents contain a minor proportion of water, the weight ratio of water to alkanol being about 1.0 to 2.0 parts water for each 10 parts of alkanol. We prefer to employ as alkanol those in which the solubility of water is limited, particularly those in which the limit of solubility lies within the designated range. An example of preferred solvent is isobutanol. Use of such solvents simplifies maintenance of the proper ratio of water to alkanol, for the ratio may be maintained simply by keeping the solution saturated with water.

Our binary solvents also contain an alkali, such as ammonia, or an alkali metal base. The total amount of alkali required is that which will convert the alkaloids from their salt forms, as they occur in the plant, to their free organic base forms. Thus, the minimum amount of alkali needed for any particular quantity of dried poppy material may be readily calculated on the basis of the known or estimated alkaloid content of the material.

The ratio of solvent to plant material and the temperature of extraction may be varied over wide ranges. For batch extractions, we usually employ not more than about 4:1 ratio of solvent to poppy straw. This represents about the minimum amount of solvent to give a slurry which can be stirred or agitated. Free-flowing, countercurrent extractions may require greater ratios. We may use greater proportions of solvent to straw in our extraction process, but for reasons of economy prefer to employ near minimum amounts. The temperature of extraction may be any temperature from room temperature or lower up to and above 60° C. Higher temperatures are desirable for rapid extractions, but efficient extraction is obtained at the lower temperatures, say in 2 hrs. or less. Likewise, an excess of alkali over that theoretically required for the conversion may be employed, but we prefer to use the minimum amount, inasmuch as excess alkali serves no useful purpose in the extraction.

The extract obtained according to our process may be treated to recover the extracted alkaloids. The treatment may vary, numerous recovery methods being readily obvious to those skilled in the art. For example, the alkaloids may be isolated by liquid-liquid extraction with aqueous mineral acid followed by alkali precipitation. The extract may be evaporated to produce a residue rich in alkaloids and the residue may then be treated to recover the alkaloids. The alkaloids may be recovered from the extract by ion exchange techniques, one of which is described and claimed in our copending application Ser. No. 290,110, filed May 26, 1952, and continuation-in-part thereof Ser. No. 356,918, filed May 22, 1953. The latter method of recovery is especially suitable for recovering the alkaloids from our extractions, and as described in our copending application, the extraction can be carried out in such a manner that an alkaloid product may be recovered in high purity and excellent yield by an overall process for extraction and recovery which includes carrying out our extraction process within certain critical limitations and combining the extraction process with a subsequent particular ion exchange recovery.

The following examples illustrate our invention.

EXAMPLE 1

In the extraction procedure, 25 g. of dried poppy straw, which had been tempered and flaked and which contained 13.2 percent moisture, was mixed with the solvents designated in the following table. The time of extraction was 12 hrs. After the extraction, the solvent was removed in a stainless steel basket centrifuge and the residual flakes immediately washed with a volume of water equal to the volume of the first extract. The extract and wash water were combined, and total solubles and morphine content were determined. The poppy straw used contained 0.52 percent morphine (dry basis).

Comparative extractions were made with acidified aqueous solvents, with water-soluble organic solvents and with ethylene dichloride, chloroform and mixtures of chloroform and ethanol. The efficiency of the extraction was considered on the basis of the amount of morphine extracted, since this is the principal alkaloid present and analytical methods for the determination of morphine are considered more reliable than any of the other alkaloids.

*Table I*

| Solvent | Solvent/ straw ratio | Temp., °C. | Time, hrs. | Weight percent of solvent | | Percent of dry straw | | Morphine extracted, percent of total |
|---|---|---|---|---|---|---|---|---|
| | | | | Alkali | Water | Solubles | Sulfated ash | |
| Chloroform | 5 | 50 | 2 | | 0 | 1.1 | | 8 |
| Sulfuric acid (0.5%) | 10 | 80 | 48 | | | 42 | | 85 |
| Water | 10 | 80 | 4 | | | 32 | 11.5 | 80 |
| Do | 10 | 80 | 8 | | | 35 | <11.5 | 100 |
| Isopropanol | 5 | 60 | 2 | 0.4 (NH₃) | 0 | 1.5 | Tr. | 50 |
| Do | 5 | 60 | 2 | | 12 | 4.9 | 0.6 | 88 |
| Isobutanol | 5 | 25 | 24 | | 0 | 1.0 | | 6 |
| Do | 5 | 60 | 4 | 1 (NaOH) | 15 | | | 100 |
| Do | 5 | 60 | 2 | 1 (NH₃) | 13 | | | 100 |
| Do | 5 | 60 | 2 | 0.5 | 17 | | | 95 |
| Do | 5 | 60 | 2 | 0.23 | 17 | | | 95 |
| N-butanol | 5 | 60 | 2 | 0.23 | 20 | | | 85 |

EXAMPLE 2

Several runs were carried out on a larger scale on poppy straw containing 9 percent moisture. The results of the extraction are shown in Table II. During the extraction the batch mixtures were intermittently stirred manually.

*Table II*

| Straw, grams | Solvent, grams | Wt. percent of solvent | | Extraction | | Percent of dry straw | | Morphine extracted, percent |
|---|---|---|---|---|---|---|---|---|
| | | Ammonia | Water | Temperature, °C. | Time, hrs. | Solubles | Sulfated ash | |
| 1,000 | 5,000 | 0.8 | 17 | 35 | 3 | 3.4 | 0.3 | 96 |
| 1,000 [1] | 4,300 | 0.23 | 17 | 60 | 2 | 4.9 | 0.3 | 100 |
| 500 | 2,150 | 0.23 | 17 | 60 | 2 | 4.6 | 0.4 | 100 |

[1] In this experiment the solvent retention was 32.5 percent.

EXAMPLE 3

A liquid-liquid extraction of an isobutanol-water binary extract, such as obtained in Example 2, was carried out with dilute sulfuric acid. The acid extract was concentrated and the alkaloid precipitated at pH 9.5 by the addition of alkali. The crude product thus obtained contained 62 percent morphine.

We claim:

1. The method of extracting opium alkaloids from poppy straw comprising extracting dried poppy straw with a solvent comprising isobutanol and water, the weight ratio of water to isobutanol being within the range of from 1:10 to the point of saturation, said solvent also containing sufficient alkali to convert the alkaloids of said poppy straw to the free base form thus to obtain an extract of alkaloids, and recovering alkaloids from said extract.

2. The method comprising extracting dried poppy straw with a solvent consisting of water-saturated isobutanol containing sufficient ammonia dissolved therein to convert the alkaloids of said poppy straw to the free base form, separating the extract from said poppy straw and recovering alkaloids from said extract.

3. The method of claim 2 in which the weight ratio of solvent to poppy straw is about 4:1.

4. Method of claim 1 in which the alkaloid is recovered from the extract by liquid-liquid extraction with acid.

References Cited in the file of this patent

UNITED STATES PATENTS 2,132,945    Frey      Oct. 11, 1938

FOREIGN PATENTS 386,038    Great Britain      Jan. 12, 1933